United States Patent [19]
Valyi

[11] Patent Number: 5,762,854
[45] Date of Patent: Jun. 9, 1998

[54] COMPRESSION MOLDING PROCESS

[76] Inventor: Emery I. Valyi, 102 Moseman Ave., Katonah, N.Y. 10536

[21] Appl. No.: 611,060

[22] Filed: Mar. 5, 1996

[51] Int. Cl.$^6$ ............................................. B29C 43/54
[52] U.S. Cl. ................ 264/255; 264/296; 264/297.5; 264/323; 425/393; 425/400; 425/414
[58] Field of Search ........................... 425/393, 400, 425/414, 528, 388; 264/255, 299, 296, 297.5, 323

[56] References Cited

U.S. PATENT DOCUMENTS

| | | |
|---|---|---|
| 2,403,042 | 8/1946 | Bogoslowsky . |
| 4,137,031 | 1/1979 | Dickson et al. ........................ 425/393 |
| 4,404,159 | 9/1983 | McFarlane ............................. 264/296 |
| 4,529,372 | 7/1985 | Saumsiegle ............................ 425/528 |
| 4,725,219 | 2/1988 | Jakobsen et al. ...................... 425/393 |
| 4,943,405 | 7/1990 | Keller et al. ........................... 284/322 |
| 5,571,540 | 11/1996 | Weyenberg et al. .................. 425/343 |

Primary Examiner—Jay H. Woo
Assistant Examiner—Iurie A. Schwartz
Attorney, Agent, or Firm—Bachman & LaPointe, P.C.

[57] ABSTRACT

A compression molding process for forming an article, preferably a preform or closure, is provided. The process includes the steps of forming thermoplastic resin into a precursor, wherein the precursor fits in a compression mold and has a shape for allowing the precursor to be supported in a predetermined or dimensionally preheld manner in a cavity of the compression mold prior to being compressed into a final shape, which shape is the shape of the compression mold; heating the precursor; and compression molding the precursor into the article while said precursor is heated. The step of forming may include the steps of extruding the resin into sheets; cutting discs from the sheets; and stacking the discs to form the precursors.

30 Claims, 5 Drawing Sheets

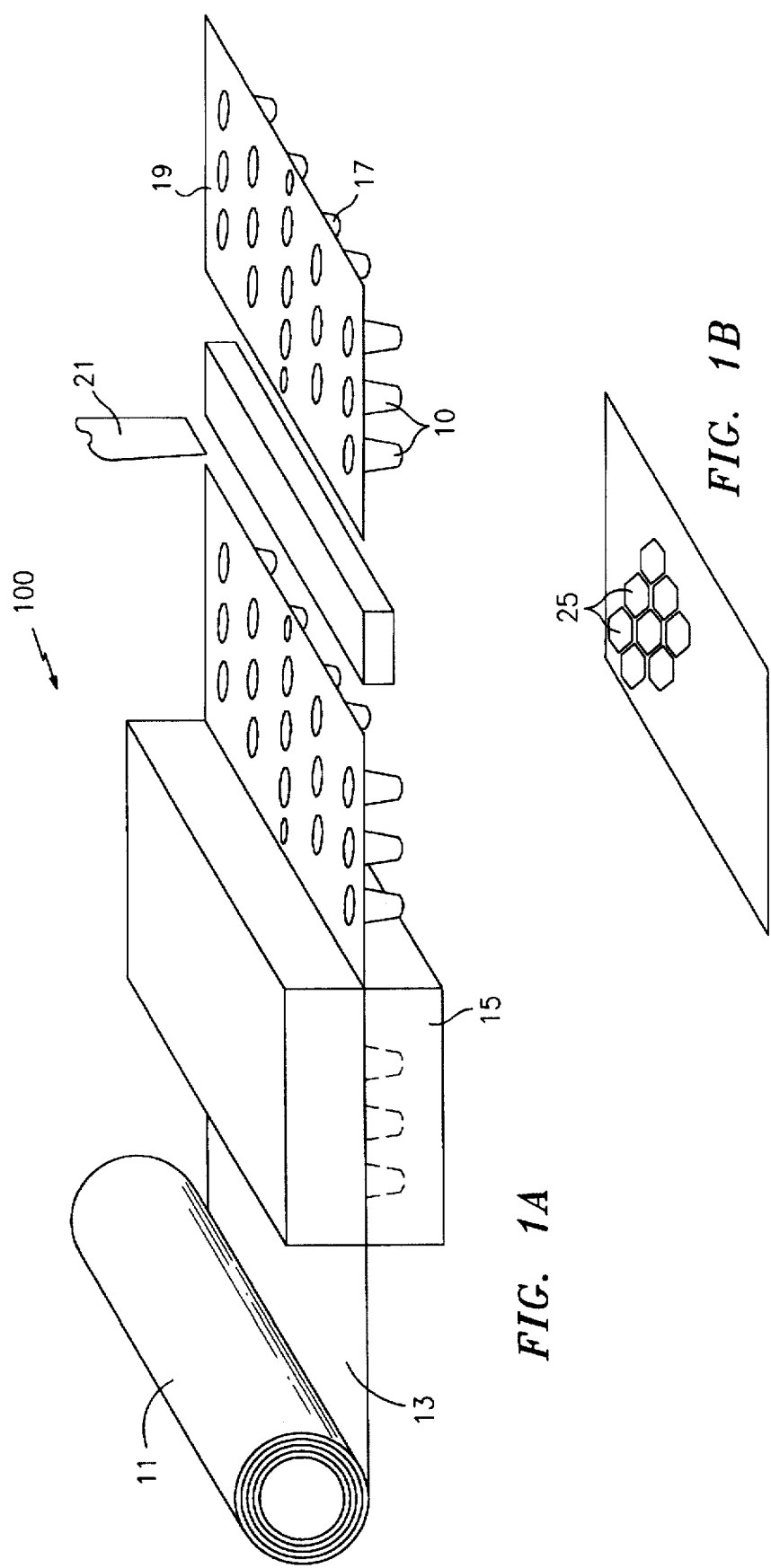

COMPRESSION MOLDING PROCESS

BACKGROUND OF THE INVENTION

This invention is directed to molding articles made of thermoplastic resins that are subject to degradation due to repeated heating and mechanical working, and more particularly, to a process using molding methods such as compression molding that do not require heating and/or mechanical working to a degree that effects substantial degradation. Such articles include preforms for the production of hollow articles, in particular, blow molded hollow articles.

Generally, a thermoplastic polymer degrades into a polymer having a lowered molecular weight when heated and when subjected to excessive input of mechanical energy, such as by external forces, particularly shear. This is generally true of the processes of extrusion and injection molding. If the desired product of these processes is to have the molecular weight correspond to a given set of properties of the polymer, allowance must be made for the degradation by starting the process with a polymer of correspondingly higher molecular weight, which is generally more costly. Also, variations in the operating conditions of these processes make it difficult to predict with accuracy what the degree of the resulting degradation will be.

In the case of injection molded products, for example, a preform used for the production of bottles made of polyethylene terephthalate (PET), its polycondensation reaction must be continued in the solid state, beyond the melt-phase, in order to start injection molding with a polymer of sufficiently elevated molecular weight and, in the case of preforms, to provide a bottle made from the preform with acceptable properties, after degradation due to injection molding. As a result, the cost of the polymer is increased. In the case of PET, substantial savings could be realized if a method were found to use a melt-phase polymer. This is possible only if the degradation due to injection molding is avoided by using a different molding process, such as compression molding.

In injection molding, degradation occurs due to the high temperature necessary to render the polymer fluid ready to inject. Additional degradation occurs due to the shear forces occurring in the extruder, in the injection system, and in the flow-passages leading to the mold cavities. By contrast, compression molding is carried out at temperatures at which negligible, if any, perceptible degradation occurs. The molding temperatures are well within the limits of heat stability, with shear and other stresses due to deformation occurring at temperatures that give rise to molecular orientation, rather than degradation. The molding condition may allow for enhancing molecular orientation during compression. Also, the residual stresses due to constrained contraction of the molded part in the mold are much reduced due to reduced shrinkage, resulting in improved dimensional stability.

Compression molding is known to require an accurately measured quantity of the to-be-molded resin to be placed into a mold cavity to be compressed into the shape determined by the cavity at a temperature that is far below injection temperature of the thermoplastics being processed.

Compression molding is commonly used for thermosetting resins inserted into the mold in the form of powders, or tablets precompressed cold in a precursor mold, both being readily metered by weight. In principle, the same could be done with thermoplastics, but only at unacceptable costs due to the need to heat, shape and cool an article, such as the tablet. Therefore, in order to use compression molding for thermoplastics effectively, it is necessary to provide an improved method of metering the charge that is to be placed into the compression mold after having heated it to the compression molding temperature.

A prior process is shown in U.S. Pat. No. 3,670,066 to Valyi, which discloses a method for compression molding articles made of thermoplastic resins. The aim of the patent is to compression mold thermoplastic articles in spite of inaccuracy of metering. In that process, an amount of plastic slightly in excess of that required to fill a mold cavity is severed from an extruded quantity and introduced into the cavity. The mold is closed to build up pressure and force the material throughout the cavity. The excess material causes a plunger in an overflow well to retract under the pressure once the center is filled so as to cause the overflow well to receive the excess material. Pressure can be maintained on material in the well during cooling to keep the cavity filled as shrinkage occurs. Where adjacent thick and thin wall portions are formed in the article, the thick wall forming portion of the cavity may contain additional wells which receive excess material and this excess material may then be forced back into the cavity under pressure to insure filling thereof meaning conformance with the geometric details of the cavity.

There exists, therefore, a need for a process for molding preforms or other products from thermoplastics, including PET, which reduces degradation of the thermoplastics due to heating and shear such as that which occurs in the injection molding and extrusion processes, if desired under conditions that enhance molecular orientation.

SUMMARY OF THE INVENTION

The primary object of this invention is to provide an improved process for molding shaped preforms including products, closures and the like.

Another object of this invention is to provide a process using a compression molding technique for molding said products such that degradation of the molding material is minimized and molecular orientation is provided, if desired.

Still another object of this invention is to provide a compression molding process for use in molding said products which process provides for more economical and efficient production thereof.

And still another object of this invention is to provide a process for molding said products from thermoplastics which process uses the technique of compression molding.

And still another object of this invention is to provide a process for molding precursors, such as preforms for blow molding that allows for the direct transfer of precursors from their mold into a finishing mold, such as a blow mold to produce a finished article.

The objects and advantages described herein are achieved by a compression molding process for forming an preform in accordance with the principles of the present invention. The process comprises the steps of forming thermoplastic resin into a precursor, wherein the precursor fits in a compression mold and has a shape for allowing the precursor to be supported in a predetermined or dimensionally preheld manner in a cavity of the compression mold prior to being compressed into a final shape, which shape is the shape of the compression mold; heating the precursor only to the compression molding temperature; and compression molding the precursor into the article while the precursor is heated. The step of forming may include the steps of extruding the resin into sheets and forming the sheets into said precursor, or cutting discs from sheets and stacking the discs to form the precursor.

BRIEF DESCRIPTION OF THE DRAWINGS

FIG. 1A is a schematic view of a thermoforming step used for forming thermoplastic precursors in accordance with the principles of the present invention;

FIG. 1B is an alternative embodiment of a portion of the thermoforming step shown in FIG. 1A;

DETAILED DESCRIPTION OF THE PREFERRED EMBODIMENT

Figure 2A:
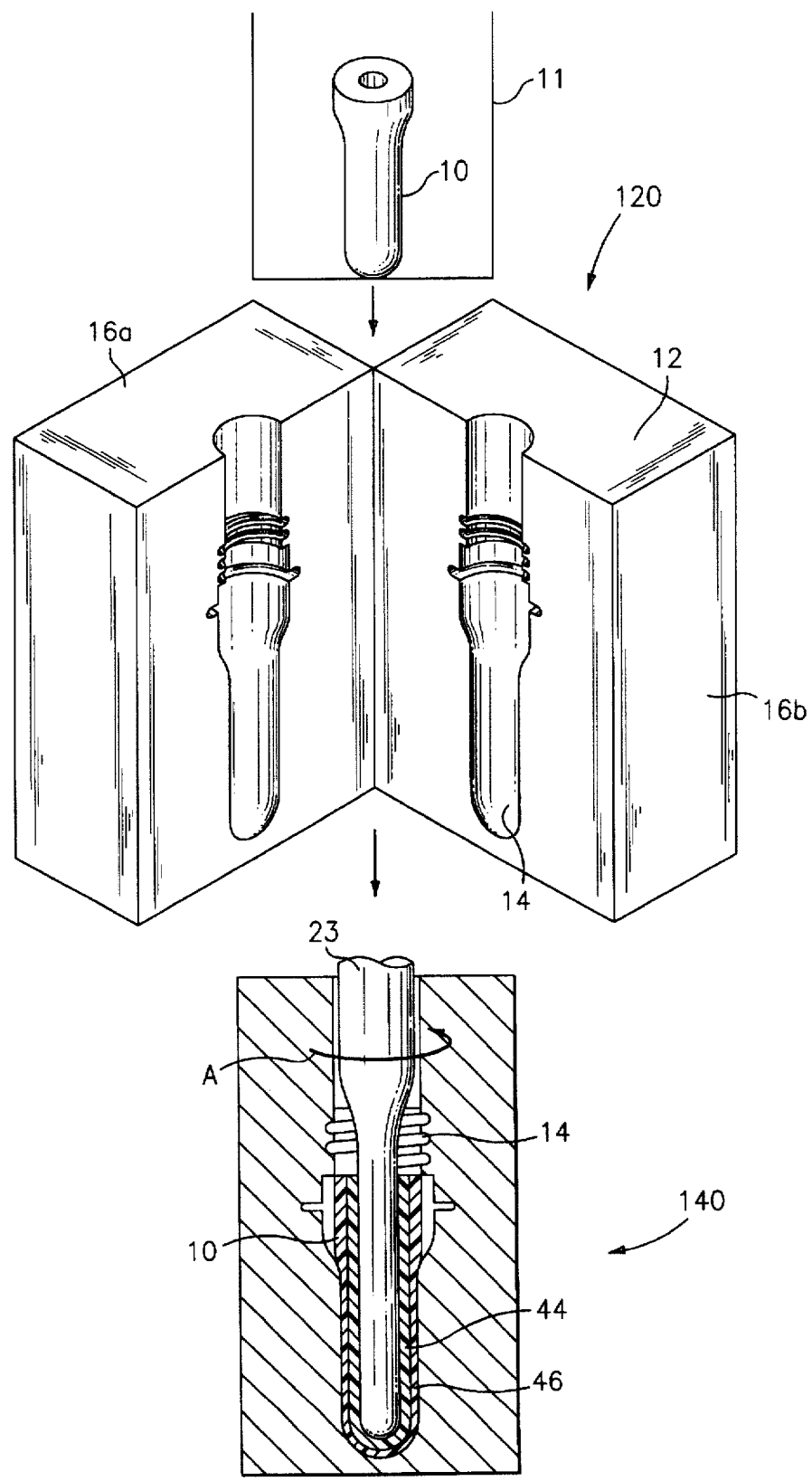
FIG. 2A is a stepwise perspective view of the materials, tools and steps used for forming preforms or other articles via compression molding in accordance with the principles of the present invention.

Referring now to the drawings in detail, there is shown in FIGS. 1A and 2A perspective views of the preferred method for producing molded thermoplastic articles such as preforms or other articles such as closures, in accordance with the principles of the present invention.

The method described in detail herein incorporates compression molding of precursors, including preform precursors, and is directed, by way of example only, to forming preforms, it being understood that this is not a limitation and other types of articles may be molded using this process.

In accordance with methods and mechanisms known in the art, precursors 10 are thermoformed in step 100, as shown in FIG. 1A. In accordance with the details shown in FIG. 1A, a web-roll 11 of thermoplastic material 13, which may have two, three or more layers of different materials, is provided adjacent thermoforming means 15. Thermoplastic material 13 is unwound and a plurality of thermoformed liners or precursors 10 are formed in the thermoforming means 15. At the same time, buttons or mold alignment means 17 are thermoformed adjacent the outermost liners. A plate 19 is severed by cutting means 21 whereby the plate 19 is formed with a configuration corresponding to the injection or preform mold face in the injection molding mold which has dowels or the like to register with the alignment means 17.

Figure 3:
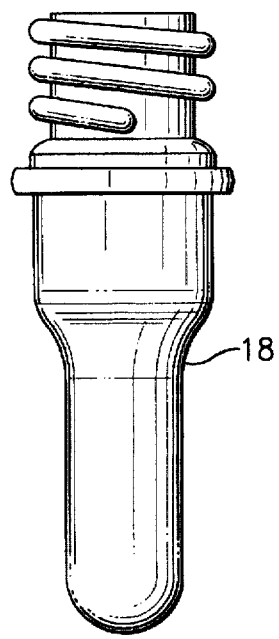
FIG. 3 is an elevational view of a preform formed from the steps shown in FIGS. 1A and 2.

Referring to FIG. 2A, in step 120, the thermoformed precursor 10 is placed in a compression mold 12 having a preform shaped impression 14 formed by mold halves 16a and 16b, for forming a preform 18, as shown in FIG. 3. Compression mold 12 may be conventional, including a press or several presses mounted on a carrier such as a rotary plate or slide, all of which are well known and not critical to the process disclosed herein. Accordingly, with precursor 10 in mold 12, a mold core 23 is inserted into the cavity of the precursor for facilitating compression molding in a manner known in the art, as shown in FIG. 2A, step 140.

As is indicated in FIG. 2A, precursor 10, thermoformed by known methods, differs from the preform substantially only in that it requires corrections with regard to contour and wall thickness distribution to become the preform.

Figure 2B:
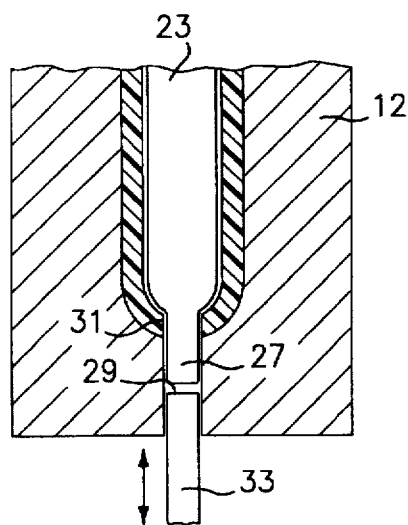
FIG. 2B is an alternate embodiment of one of the steps of the method shown in FIG. 2A.

Mold core 23 may be too slender to avoid bending during compression. To avoid such bending, which would result in uneven wall thickness of preform 18, the core includes a smaller diameter tip 27 which may be supported for stabilizing the core, in a corresponding cavity 29 in mold 12, as shown in FIG. 2B, during initial compression, thus forming a hole 31 at the base of the preform. The hole may be closed by withdrawing the core from the cavity while continuing compression and at the same time closing the indentation by plunger 33, as shown, reciprocally movable in the hole as indicated by the arrow. As plunger 33 moves upwardly, excess material is caused via plunger 33 to fill cavity 29.

Figure 4:
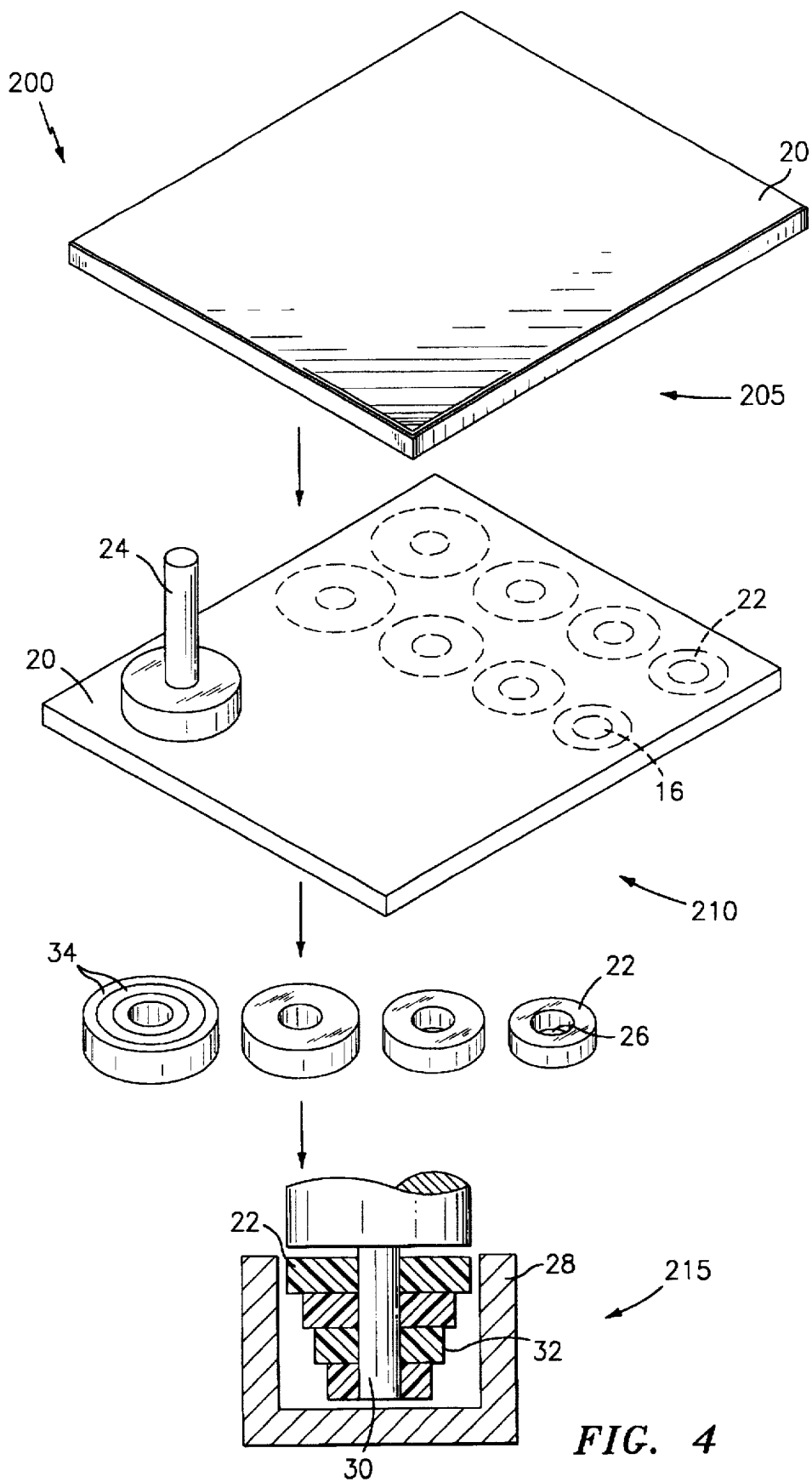
FIG. 4 is a perspective view of another process for forming a precursor in accordance with the principles of the present invention, for use in forming a preform or other article in accordance with the steps of FIG. 2.

In an alternative process for forming the precursor of considerable wall thickness, the precursor forming step 200 includes substep 205 of extruding a thermoplastic sheet 20, for example, formed from PET, as shown in FIG. 4, thin enough to preclude the occurrence of undesirable effects of cooling slowly, such as opacity caused by crystallizing when using very thick sheets for forming thicker preforms. In substep 210, discs 22 are stamped out of sheet 26 via a punch 24 by well known means. Preferably, each of discs 22 is stamped out of sheet 20 with a center hole 16 so as to provide less thermoplastic material to be displaced when forming a preform by compression molding. Discs 22 may be slightly incremental in outside diameter such that upon stacking or laminating, a gradual conical shape of the stack is acquired. However, the discs are substantially uniform in inside diameter for assisting in the stacking step, except for a slight taper, if required for rod 30. In substep 215, discs 22 are stacked using a stacking fixture 28, in the form of an enclosure. The number of discs used, shown here as four, is dependent upon the thickness of the stamped out discs and the length of the preform being molded. After the discs are stacked in stacking fixture 28 in step 215, an alignment fixture comprising a rod 30 is placed through the center holes 16 of discs 22 for aligning the discs in stack 32. The size and shape of stack 32 should be controlled so that upon placement of stack 32 into a compression mold, the discs will provide enough material but not too much, for forming a preform via the subsequent step of compression molding, as shown in FIG. 2A.

After alignment in step 215, precursor 10 is formed then inserted into compression mold 12 as discussed above, as shown in step 120 of FIG. 2A, for forming preform 18, shown in FIG. 3.

If the process requires that preform 18 be laminated, to have, for example, a barrier layer in addition to other layers, discs 22 of stack 32 may include concentric layers 34, shown in step 210 of FIG. 4, defined by differing plastics, corresponding to the purpose of the layer properties, such as barrier properties. Accordingly, a laminated precursor can be formed for forming a laminated preform.

Figure 5:
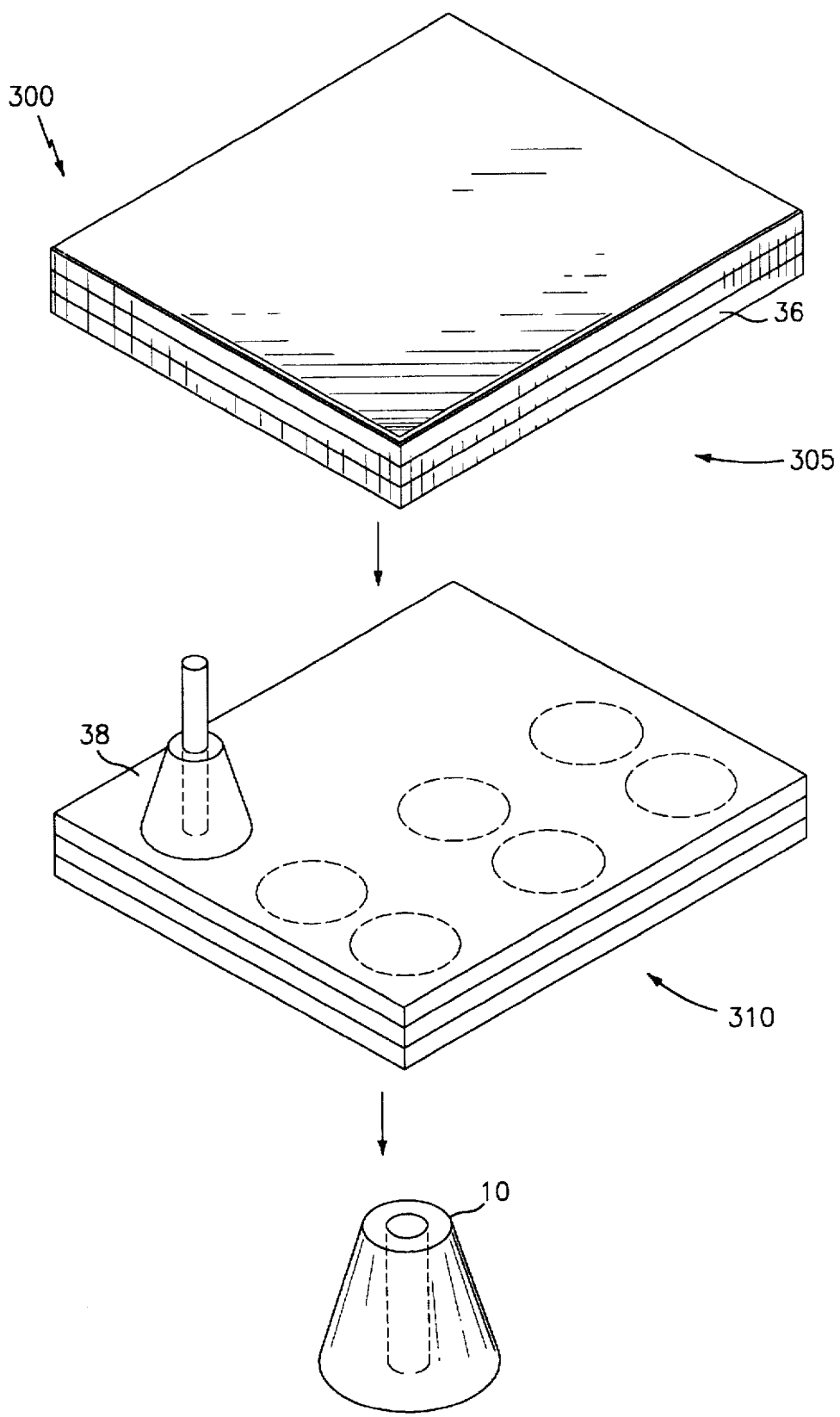
FIG. 5 is a perspective view of another embodiment of a process for forming precursors in accordance with the principles of the present invention for use in forming a preform or other article in accordance with the steps of FIG. 2.

As an alternative for thermoforming precursors and to forming and stacking discs 22 as shown in steps 100 and 210, 215, and referring to step 300 of FIG. 5, in substep 305, a multi-layered sheet 36 can be formed by co-extrusion or other laminating processes known in the art. In substep 310, precursor 10 can be thermoformed as in step 100 or formed by stamping as via an alternative type of stamping mechanism 38. Once precursor 10 is formed via substep 305 and 310, the process resumes with steps 120 and 140, discussed above.

In the precursor forming methods of FIGS. 1, 2A and 4, the precursor may be thermoformed, formed by discs, or punched, respectively, to have hexagonal cross-sectioned shapes so that the discs nest and scrap is reduced during thermoforming, as shown by hexagonal shapes 25, for example, in FIG. 1B.

Figure 6:
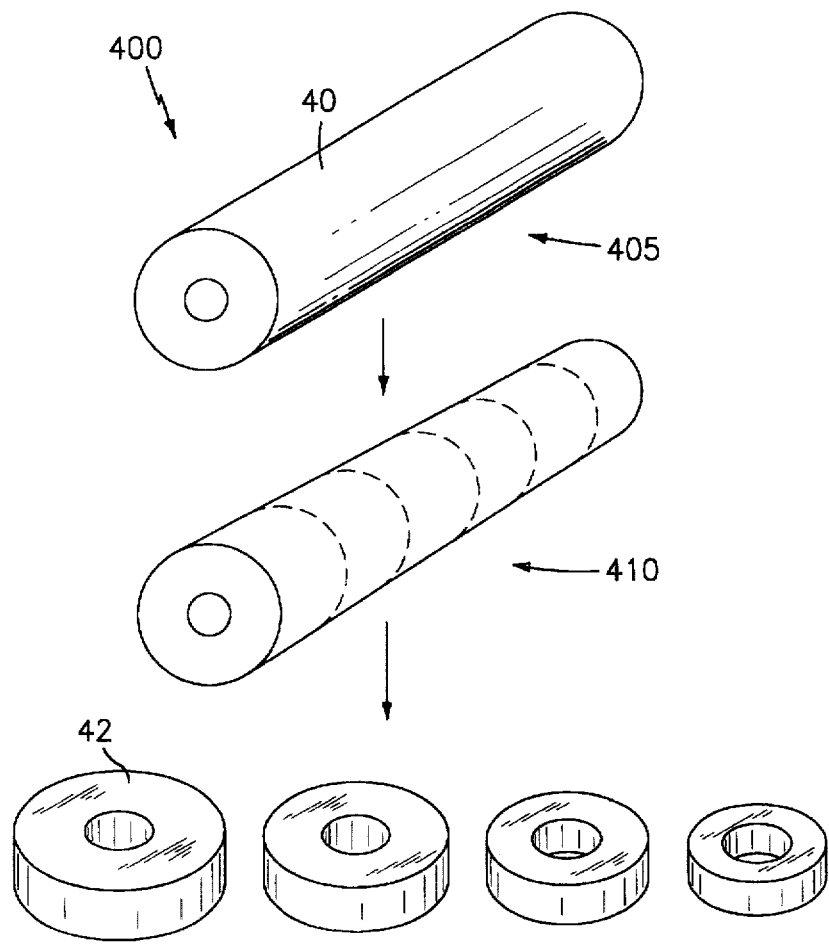
FIG. 6 is a perspective view of yet another embodiment of a process for forming precursors in accordance with the principles of the present invention for use in forming a preform or other article in accordance with the steps of FIG. 2.

Alternatively, and as shown in FIG. 6, steps 100 and 300 and substeps 205 and 210, can be replaced by step 400 including substeps 405 and 410, wherein tubes 40 of thermoplastic are extruded and cut into discs 42. Tube 40 and discs 42 cut from them may have slightly incremental outer diameter and a center hole having a constant diameter. Accordingly, upon cutting tubes 40 in step 410 via conventional means, discs of increasing outer diameter, similar to discs 22 shown in FIG. 4, are formed. The process then resumes with stacking or laminating fixture 28 at substep 215 and steps 120 and 140, similar to as described above.

The procedures used for forming precursor 10 may depend on the size and shape of the precursor being formed and/or time factors. In most instances, sheet extrusion followed by stamping is the preferred embodiment, since it is faster than tube extrusion followed by cutting. In all of the procedures discussed above for forming precursor 10, minimal scrap is formed. For example, substantially no scrap is formed in the case of known methods of thermoforming if hexagonal precursors 25 are formed from sheet, as above, nor in tube extrusion. Accordingly, there is no effective loss of material.

The compression molding step causes some degree of molecular orientation due to displacement of the material. Orientation may be enhanced by twisting core 23, as in the direction of arrow A as shown in FIG. 2A while the precursor or preform is in mold 12 under compression, thereby causing circumferential orientation via circumferential expansion. Accordingly, shear orientation is thereby achieved, which is not destroyed during subsequent forming of the preform, and thus improves the properties of the finished article made from the preform.

The process steps discussed above are preferably performed in the manner which follows, which may be fully automated. Precursors 10 are formed in accordance with one of the embodiments shown by FIGS. 1A, 4, 5 and 6, preferably the thermoforming embodiment shown in FIG. 1A. Steps 120 and 140, substantially applicable to all of the embodiments of the processes discussed above, show the process of compression molding. Prior to placing precursor 10 into compression mold 12 to form preform 18, precursor 10 is heated in some manner, such as shown by heating means 11 in FIG. 2A, preferably by using microwaves, radiant heaters, or a combination of both, preferably as is discussed in U.S. Pat. No. 4,407,651 to Beck et al. issued Oct. 4, 1983. Preferably, precursor 10 is carried by known conveyor means (not shown) through heating zones (not shown) having the heating devices as discussed above and is then inserted automatically into compression mold 10.

Precursor 10, due to its process of formation, incompletely fills the compression mold, as shown in step 140. That is, precursor 10 does not fill areas such as the threads of the neck, and other non-threaded areas. Nor is the desired wall thickness distribution of preform mold 12 achieved. Accordingly, in step 140, in order to form these areas, the precursor has a quantity of material 44, shown in FIG. 2A as the innermost layer 44 that is not needed for forming preform 18 at the main body cavity portion 46 of mold 12. This extra material 44 is displaced and distributed during compression molding via core 23 into the neck and other areas, for obtaining the required wall thickness and material distribution at these areas, which thickness and distribution, prior to compression molding, differentiate the shape of the desired preform 18 and preform mold cavity 14 from the shape of precursor 10. Core 23 may be used at the same time to induce shear orientation, as above described.

Continuing in step 140, after molding, the formed precursor is cooled in the compression mold and now preform 18 left in mold 12 until it has cooled enough for removal. If further finishing operations are required to complete the molding of a product from the preform, such as when the product is a hollow article blown from a preform 18, compression mold 12 may be kept at the temperature at which the finishing operations such as blowing or stretch blowing may be performed. In such a case, heating of preforms during finishing operations such as blow molding may be eliminated. In other cases, where the product is a closure or something else not requiring additional operations, the molding operation is considered complete.

In the case described in detail herein where preform 18 is being formed, the finishing operation is to blow mold the preform to form a container. This step is carried out in any conventional manner with the difference that compression mold 12 furnishes the preform for the blow molding process instead of the typically used injection molds. In blow molding, reheating in a two-stage process may be eliminated by using the heated compression mold heated to the blow molding temperature, as discussed above, thus simplifying the blow molding apparatus considerably.

As discussed, an alternative for the production of precursors 10 is by extruding a sheet which may be a multi-layered sheet 36. Using known technology, the sheet that is extruded may be mono-axially or bi-axially oriented. The oriented morphology may be further enhanced by shear, as above and will, accordingly, transfer through the precursor to the preform. This residual orientation will also transfer from the preform to the blown article. While such orientation will not add much to that obtained at the most attenuated regions of the blown articles, the resulting orientation will exceed that now found in their regions of little or no orientation such as, for example, the shoulder and the neck and rim regions. It is possible, therefore, to produce a blown article whose finish, including the rim, is reasonably ductile. This has great value for wide mouth containers, cups, tubs and the like.

The primary advantage of this invention is that an improved process is provided for molding preforms and similar products. Another advantage of this invention is that a process is provided using a compression molding technique for molding preforms and other products such that degradation of the molding material is minimized. Still another advantage of this invention is that a process is provided for molding preforms and other products from different thermoplastics which uses the technique of compression molding. And still another advantage of this invention is that a compression molding process is provided for use in molding preforms and other products which process provides improved orientation, and more economical and efficient production of preforms and other products.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for producing a preform, comprising the steps of:
   providing a compression mold having a closed bottom and a cavity forming the shape of a preform;
   forming thermoplastic resin into a precursor having a main body portion and placing said precursor into said compression mold wherein said precursor in its entirety fits within said cavity in fixed relationship therein and, wherein said precursor incompletely fills said compression mold and has a shape for allowing said precursor to be supported in a predetermined manner in said cavity of said compression mold prior to being compressed into a final shape, which final shape is the shape of said compression mold;
   heating said precursor prior to placing said precursor in said compression mold; and
   compression molding said heated precursor in said compression mold into a preform having a neck region, a closed bottom and a body portion between the neck and the bottom, and including the step of displacing material from the main body portion of the precursor during the compression molding step and distributing said displaced material into areas of said preform.

2. The process according to claim 1, wherein said step of forming includes the steps of:
   extruding said resin into sheets; and
   forming said sheets into said precursors.

3. The process according to claim 2, wherein said step of forming includes thermoforming, including thermoforming said precursors to have a shape wherein said precursors nest on said sheet to minimize the formation of scrap.

4. The process according to claim 3, wherein said shape is hexagonal.

5. The process according to claim 3, wherein said shape is formed at an open end of said precursor.

6. The process according to claim 1, wherein said step of forming comprises the steps of:
   extruding said resin into sheets;
   cutting discs from said sheets; and
   stacking said discs to form said precursors.

7. The process according to claim 6, wherein said discs form layers of differing materials with differing properties for forming layered articles.

8. The process according to claim 6, further comprising the step of inserting said precursor formed from said discs into a compression mold.

9. The process according to claim 6, further comprising the step of providing a plurality of said discs each having a hole therethrough.

10. The process according to claim 1, further comprising the steps of:
    extruding sheets from said resin;
    laminating said sheets; and
    cutting precursors from said laminated sheets.

11. The process according to claim 10, wherein said step of laminating comprises co-extruding said sheets for forming a stack of sheets.

12. The process according to claim 1, wherein said step of forming comprises the steps of:
    extruding a tube from said resin;
    cutting discs from said tube; and
    laminating said discs to form said precursor.

13. The process according to claim 12, wherein said step of extruding further includes extruding said tube to have a substantially uniform inside diameter.

14. The process according to claim 12, wherein tubes of decreasing diameter are extruded and the discs cut therefrom are stacked to form a tapered stack.

15. The process according to claim 1, further including the steps of:
    inserting said precursor into said compression mold, wherein said compression mold includes a main body portion closely coinciding with a main body portion of an article and a section for molding at least one of a threaded neck portion, a rim, a support ring, and variable thicknesses; and
    incompletely filling said section with material from said precursor, wherein said precursor includes a quantity of material adapted to be located in said main body portion which exceeds the amount needed to form said main body portion of said article,
    wherein said step of compression molding includes the step of distributing said quantity of material from said main body portion of said compression mold to said section for obtaining prescribed shapes and thicknesses throughout said mold.

16. The process according to claim 6, wherein said step of stacking further includes the step of aligning said discs in a stacking fixture.

17. The process according to claim 16, wherein each of said discs has a substantially centrally located opening therethrough, said step of aligning including using an alignment mechanism in conjunction with said opening of each of said discs while said discs are stacked for placing said discs into alignment.

18. The process according to claim 17, wherein said alignment mechanism comprises a rod for placement through each opening of each of said discs.

19. The process according to claim 16, wherein said stacking fixture comprises an enclosure for receiving said discs.

20. The process according to claim 1, including the step of supporting the precursor in the compression mold at least in part by a core.

21. The process according to claim 20, including the step of stabilizing the core in the compression mold.

22. The process according to claim 21, including the step of providing that the core makes a hole at the bottom of the precursor, and closing the hole upon withdrawing the core, by compression.

23. The process according to claim 1, including the step of enhancing orientation in the precursor and preform.

24. The process according to claim 23, wherein orientation is enhanced in the neck region.

25. The process according to claim 23, wherein said step of enhancing comprises:
    inserting a core in a precursor; and
    causing said precursor to expand circumferentially and thereby causing circumferential orientation in the wall of the precursor.

26. The process according to claim 25, wherein said orientation is further enhanced by orientation caused by shear.

27. The process according to claim 1, wherein substantially all of said precursor is compression molded in said compression molding step.

28. The process according to claim 1, wherein said preform includes a threaded neck region.

29. The process according to claim 1, wherein said displaced material is at least in part distributed into the neck region of said preform.

30. The process according to claim 29, wherein said preform includes a shoulder, neck and rim regions, and wherein said compression molding step causes orientation in said shoulder, neck and rim regions.

* * * * *